(12) United States Patent
Guler et al.

(10) Patent No.: US 11,915,365 B2
(45) Date of Patent: Feb. 27, 2024

(54) 3D BODY MODEL GENERATION

(71) Applicant: Snap Inc., Santa Monica, CA (US)

(72) Inventors: Riza Alp Guler, London (GB); Haoyang Wang, London (GB); Iason Kokkinos, London (GB); Stefanos Zafeiriou, London (GB)

(73) Assignee: Snap Inc., Santa Monica, CA (US)

( * ) Notice: Subject to any disclaimer, the term of this patent is extended or adjusted under 35 U.S.C. 154(b) by 182 days.

(21) Appl. No.: 16/949,781

(22) Filed: Nov. 13, 2020

(65) Prior Publication Data

US 2021/0150806 A1   May 20, 2021

Related U.S. Application Data

(60) Provisional application No. 62/936,272, filed on Nov. 15, 2019.

(51) Int. Cl.
*G06T 17/00* (2006.01)
*G06V 20/64* (2022.01)

(52) U.S. Cl.
CPC .............. *G06T 17/00* (2013.01); *G06V 20/64* (2022.01)

(58) Field of Classification Search
CPC ..... G06T 17/00; G06T 13/40; G06T 2200/08; G06T 2207/20084; G06T 9/002; G06T 2207/30196; G06T 2219/2016; G06T 7/00; G06V 20/64
See application file for complete search history.

(56) References Cited

U.S. PATENT DOCUMENTS

2014/0078144 A1   3/2014  Berriman et al.
2020/0005138 A1*  1/2020  Wedig .................... G06N 3/048

FOREIGN PATENT DOCUMENTS

CN       114981844 A     8/2022
WO    WO-2021094537 A1   5/2021

OTHER PUBLICATIONS

"Yusuke Yoshiyasu, Skeleton Transformer Networks: 3D Human Pose and Skinned Mesh from Single RGB Image, May 2019, National Inst. of Adv. Industrial Science and Technology Tokyo Japan, Computer Science vol. 11364, p. 485-500" (Year: 2019).*
"Yebin Liu, Juergen Gall, Markerless Motion Capture of Multiple Characters Using Multiview Image Segmentation, Nov. 2013, IEEE Transactions on Pattern Analysis and Machine Intelligence, vol. 35, No. 11, 2720-2735" (Year: 2013).*

(Continued)

*Primary Examiner* — Andrae S Allison
*Assistant Examiner* — Phuong Hau Cai
(74) *Attorney, Agent, or Firm* — Schwegman Lundberg & Woessner, P.A.

(57) ABSTRACT

Aspects of the present disclosure involve a system and a method for performing operations comprising: receiving a plurality of bone scale coefficients each corresponding to respective bones of a skeleton model; receiving a plurality of joint angle coefficients that collectively define a pose for the skeleton model; generating the skeleton model based on the received bone scale coefficients and the received joint angle coefficients; generating a base surface based on the plurality of bone scale coefficients; generating an identity surface by deformation of the base surface; and generating the 3D body model by mapping the identity surface onto the posed skeleton model.

20 Claims, 12 Drawing Sheets

(56) References Cited

OTHER PUBLICATIONS

"Mazen Al Borno, Ludovic Righetti, Michael J. Black, Scott L. Delp, Eugene Fiume, and Javier Romero, Robust Physics-based Motion Retargeting with Realistic Body Shapes, 2018, ACM SIGGRAPH / Eurographics Symposium on Computer Animation 2018 vol. 37 (2018), No. 8" (Year: 2018).*

"Liguo Jiang, Juntao Ye, Liming Sun, Jituo Li, Transferring and fitting fixed-sized garments onto bodies of various dimensions and postures, Jan. 2019, Computer-Aided Design 106 (2019), 30-42" (Year: 2019).*

"Vasu Parameswaran et. al., View Independent Human Body Pose Estimation from a Single Perspective Image, Proceedings of the 2004 IEEE Computer Society Conference on Computer Vision and Pattern Recognition CVPR'04 1063-6919/04, 2004" (Year: 2004).*

"Hua-Wei Pan et. al., A method of real-time human motion retargeting for 3D terrain adaption, IEEE Conference Anthology, Jan. 2013, 2011 13th IEE Joint International Computer Science and Information Technology" (Year: 2013).*

"International Application Serial No. PCT/EP2020/082062, International Search Report dated Feb. 5, 2021", 5 pgs.

"International Application Serial No. PCT/EP2020/082062, Written Opinion dated Feb. 5, 2021", 6 pgs.

Bogo, Federica, "Keep It SMPL: Automatic Estimation of 3D Human Pose and Shape from a Single Image", 14th European Conference on Computer Vision, ECCV 2016, Springer, arXiv:1607.08128v1 [cs:CV], (2016), 18 pgs.

Guan, Peng, "Estimating human shape and pose from a single image", 2009 IEEE 12th International Conference on Computer Vision, IEEE, Piscataway, NJ, USA, (Sep. 29, 2009), 1381-1388.

Loper, Matthew, "SMPL: A Skinned Mutli-Person Linear Model", ACM Transactions on Graphics, ACM, NY, US, vol. 34, No. 6, (Oct. 26, 2015), 16 pgs.

Wang, Haoyang, "BLSM: A Bone-Level Skinned Model of the Human Mesh", 16th European Conference on Computer Vision, ECCV 2020, Springer, vol. 12350, (Jan. 1, 2020), 16 pgs.

"International Application Serial No. PCT/EP2020/082062, International Preliminary Report on Patentability dated May 27, 2022", 8 pgs.

"European Application Serial No. 20807350.2, Response to Communication pursuant to Rules 161 and 162 filed Dec. 14, 2022", 19 pgs.

"Korean Application Serial No. 10-2022-7019676, Notice of Preliminary Rejection dated Dec. 27, 23", w English translation, 15 pgs.

Loper, Matthew, "SMPL: A Skinned Multi-Person Linear Model", ACM Transactions on Graphics, vol. 34, No. 6, Article 248, [Online]. Retrieved from the Internet: https: doi.org 10.1145 2816795.2818013, (Nov. 2015), 16 pages.

* cited by examiner

3D BODY MODEL GENERATION

CLAIM FOR PRIORITY

This present application claims the benefit of priority to U.S. Provisional Application No. 62/936,272, filed Nov. 15, 2019, which is herein incorporated by reference in its entirety.

TECHNICAL FIELD

The present disclosure relates to the generation of 3D body models and their use for image-driven character animation.

BACKGROUND

Modern day user devices provide messaging applications that allow users to exchange messages with one another. Such messaging applications have recently started incorporating graphics in such communications. The graphics can include avatars or cartoons that mimic user actions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
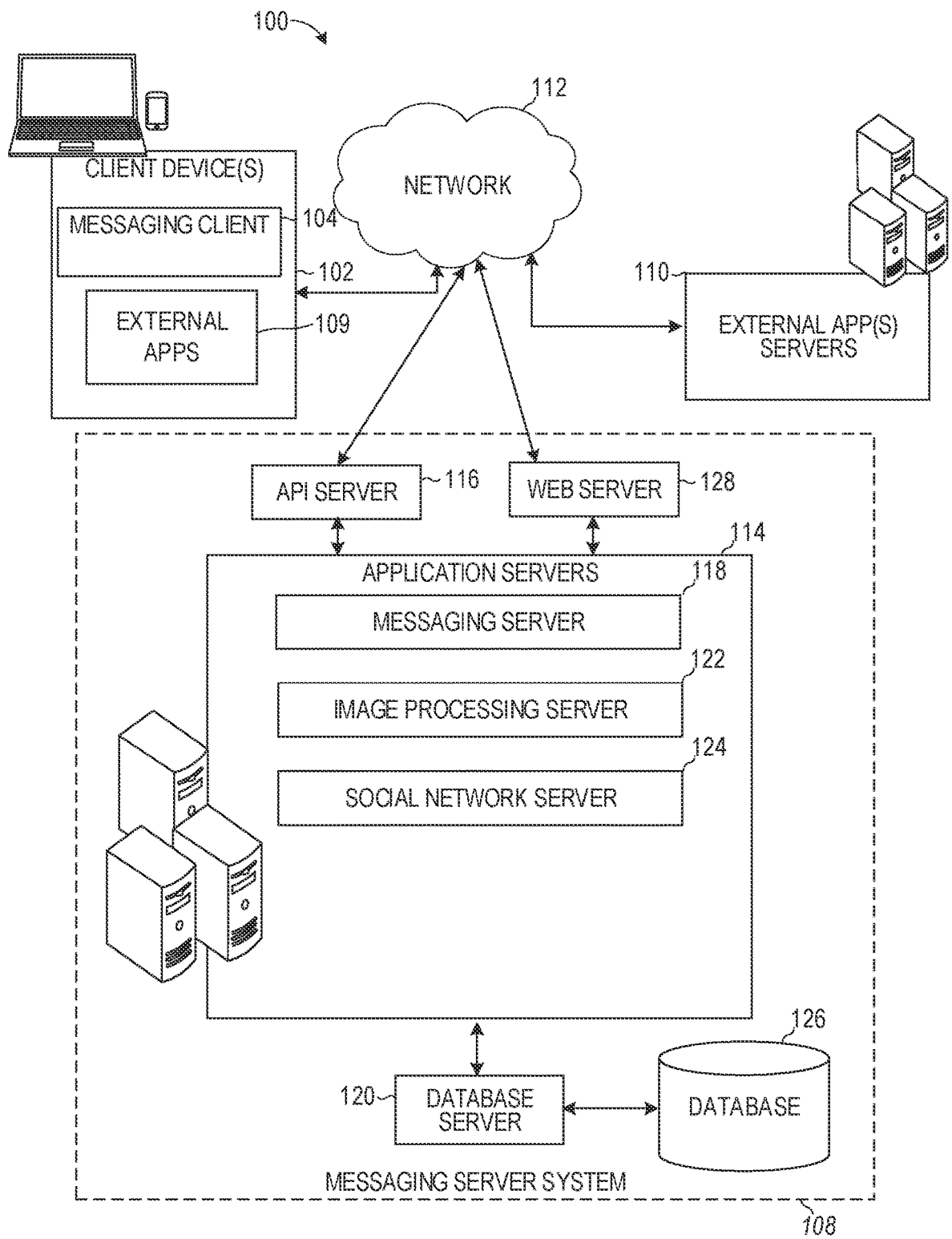
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Mesh-level representations of the human body form a bridge between computer graphics and computer vision, facilitating a broad array of applications in motion capture, monocular 3D reconstruction, human synthesis, character animation, and augmented reality. The articulated human body deformations can be captured by rigged modelling where a skeleton animates a template (mesh) shape. Current models, such as a skinned multi-person linear model (SMPL), first synthesize the template mesh in a canonical pose through an expansion on a linear basis. The skeleton joints are then estimated post-hoc by regressing from the synthesized mesh to the joints. While such systems generally work well, their complexities make them impractical to implement on mobile devices and in everyday applications. Also, because their model encodes shape and pose information, they are not easy to control and adapt to new poses, especially not in real-time.

This disclosure describes methods of generating 3D body models and, in particular, to a bone-level skinned model where bone scales are set prior to template synthesis. The bone scales can be manually specified by a user prior to template synthesis or can be determined in an automated process (e.g., using one or more machine learning techniques). Specifically, the disclosed embodiments provide an improved system for generating 3D models by disentangling bone length variability from acquired body traits that are dependent on other factors, such as exercise or dietary habits. The disclosed embodiments first model bone length-driven mesh variability in isolation, and then combine it with identity-specific updates to represent the full distribution of bodies. This disentangled representation results in more compact models, which enable highly-accurate reconstructions to be obtained with a low parameter count. The disclosed embodiments model the mesh synthesis as the sequential specification of identity-specific bone length, pose-specific joint angles, and identity-specific surface variation, bundled together through linear blend skinning. In one application, decoupling bone lengths from identity-specific variation can be used to retarget an outfit to a person by, for example, scaling the rigged outfit's lengths to match those of the person, while preserving the bone length-independent part of the outfit shape.

In this way, embodiments of the application provide a more efficient process of generating such 3D models. By first modelling the skeleton, the required set of input parameters can be reduced in size. The input parameter set can be significantly reduced to include the bone scale coefficients and joint angle coefficients only. Furthermore, the use of such parameters can be more intuitive to a user. By making the bone scaling factors explicitly controllable, a more intuitive control of the output 3D body shape can be provided. While the disclosed techniques are described in connection with human based 3D bodies, the same or similar techniques apply to any other type of 3D body (e.g., animal bodies or portions of a human or animal body).

According to a first aspect, this disclosure describes a computer implemented method of generating a 3D body model, the method comprising: receiving a plurality of bone scale coefficients each corresponding to respective bones of a skeleton model; receiving a plurality of joint angle coefficients that collectively define a pose for the skeleton model; generating the skeleton model based on the received bone scale coefficients and the received joint angle coefficients; generating a base surface based on the plurality of bone scale coefficients; generating an identity surface by deformation of the base surface; and generating the 3D body model by mapping the identity surface onto the posed skeleton model.

The skeleton model may be based on a tree-structured graph. Generating the skeleton model may include a recursive generation of a root bone element and a plurality of leaf bone elements.

The skeleton model may define a resting position for each bone element. The resting position for each bone element may be represented by a template rotation matrix and a translation vector for the respective element.

The skeleton model may further define a rotation matrix and a scaling factor for each bone element. The rotation matrix and the scaling factor are applied recursively to each bone element in sequence.

Each of the plurality of joint angle coefficients may be restrained to a kinematically valid range. Each joint between two bone elements may be limited to certain realistic degrees of freedom. For example, an elbow may be constrained to a single degree of freedom. Each rotation may be further limited to a realistic range. For example, the joint angle coefficients may be restrained by mapping a corresponding unconstrained variable to the kinematically valid angular range.

According to an embodiment, there may be a total of 47 joint angle coefficients, corresponding to 47 degrees of freedom in the skeleton model. However, other skeleton models may be utilized having a greater or lesser number of bone elements. Other skeleton models may therefore have a greater or lesser number of joint angle coefficients.

Restraining the model in this way (to a number of joint angle coefficients) can make processing more efficient. The restraints may be applied within the model itself. The method thus avoids the need to test generated models post-hoc for kinematic accuracy, for example, through adversarial training methods. The method can similarly improve pose identification, where the application of kinematic constraints improves the accuracy of identification, in comparison with a process of post-hoc checking for kinematic feasibility.

Generating the base surface may include generating a mean surface and then applying a correction to the mean surface based on a bone-length dependent deformation. In this way, modelling the skeleton first simplifies the required parameters for generating a 3D body model. Variations in body type can be automatically accounted for in the bone-length dependent deformation. In this way, features of body type and identity body variation may be decoupled. Embodiments of the method may thereby reduce many parameters to the level of identity features which can be mapped as modifications to a general body type surface.

In some embodiments, a linear blend skinning process may be used for mapping the identity surface onto the posed skeleton model. The linear blend skinning process may include mapping a surface point on the identity surface based on a bone element of the skeleton model, by charting the surface point with respect to a resting position for the bone element, and transporting the charted point based on a posed position for the respective bone element. The surface point on the identity surface may be mapped in this way based on each bone element of the skeleton model, and a weighting factor may be calculated for each respective mapping.

In some implementations, the 3D body model generation may be used in a process of character animation. An input 2D image may be provided to the apparatus, wherein the input 2D image includes a representation of at least one body. The plurality of bone scale coefficients and the plurality of joint angle coefficients may be determined based on image processing of the input 2D image. For example, in some implementations a deep convolutional neural network may be used to detect the presence of at least one body in the image, and to estimate the plurality of bone scale coefficients and the plurality of joint angle coefficients for the at least one detected body.

An output 2D image may thus be generated based on the input 2D image and the generated 3D body model, where the representation of a body in the input image is replaced or supplemented with a corresponding 2D representation of the 3D body model. For example, the character may be rigged with a set of skeletal bones and joints. The skeletal rig of the character can be adjusted based on the skeletal information generated by the model for the person depicted in the 2D image. In an example, some components of the skeletal rig can be reduced in size to match the corresponding skeletal bones of the model of the person while others remain the same or are increased in size. This way, the character animation can match or correspond to the person depicted in the image. For example, if the person depicted in the image has longer arms than the skeletal rig of the character animation, the arms of the skeletal rig can be enlarged to give the character animation the appearance of longer arms. As another example, if the person depicted in the image is overweight or has a large amount of body mass, the size of the character animation can similarly be increased.

The 3D body model may be generated based on the plurality of bone scale coefficients and the plurality of joint angle coefficients determined from the input 2D image, and projected onto a 2D projection, based on the input 2D image. The resulting 2D projection may be overlaid onto the representation of a body in the input image.

The presently disclosed method of character animation can avoid unrealistic shape distortion when mapping onto an image. Through the above-described decoupling of body type and identity body shape variations, the character may be scaled according to detected bone size and the shape may be deformed accordingly for a realistic body type, without affecting the identifying variations of the character.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

Figure 2:
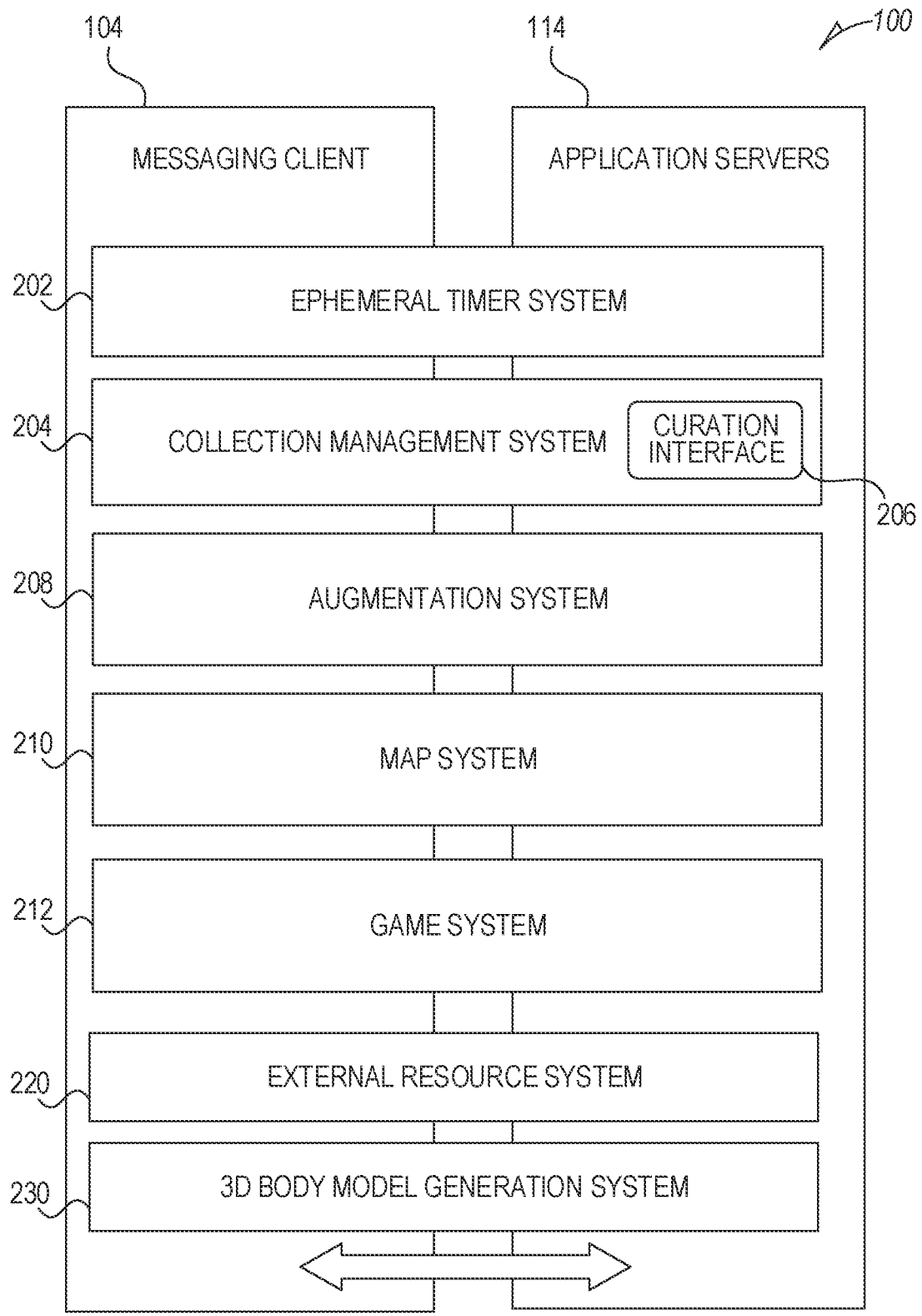
FIG. 2 is a diagrammatic representation of a messaging system, in accordance with some examples, that has both client-side and server-side functionality.

The application servers 114 also include an image processing server 122 that is dedicated to performing various image processing operations, typically with respect to images or video within the payload of a message sent from or received at the messaging server 118. Detailed functionality of the image processing server 122 is shown and described in connection with FIG. 5. Image processing server 122 is used to implement 3D body model generation operations of the 3D body model generation system 230 (FIG. 2).

In one embodiment, the image processing server 122 detects a person in a 2D image. The image processing server 122 generates a set of landmarks representing bones/joints of the person detected in the 2D image. The image processing server 122 adjusts parameters of the model generated by the 3D body model generation system 230 based on the set of landmarks to generate a skeleton and template corresponding to the person detected in the 2D image. A character animation or avatar can be selected (e.g., the user can manually select a desired avatar or one can be automatically retrieved and selected). The skeletal rig used to generate the character animation or avatar is adjusted based on the skeleton and template generated by the 3D body model generation system 230 to represent the physical attributes of the person depicted in the 2D image. As an example, the arms of the skeletal rig can be enlarged to match the arms' skeletal bones of the person depicted in the image. Specifically, if the person's arms are longer than the average person represented by the avatar rig, the arms of the avatar rig can be extended. A different user with shorter arms may cause the avatar rig to be generated with shorter arms. This way, the avatar or character generated based on the skeletal rig can more closely mirror the physical attributes of the person depicted in the 2D image. The avatar can then replace or supplement the person in the 2D image and/or video.

Figure 3:
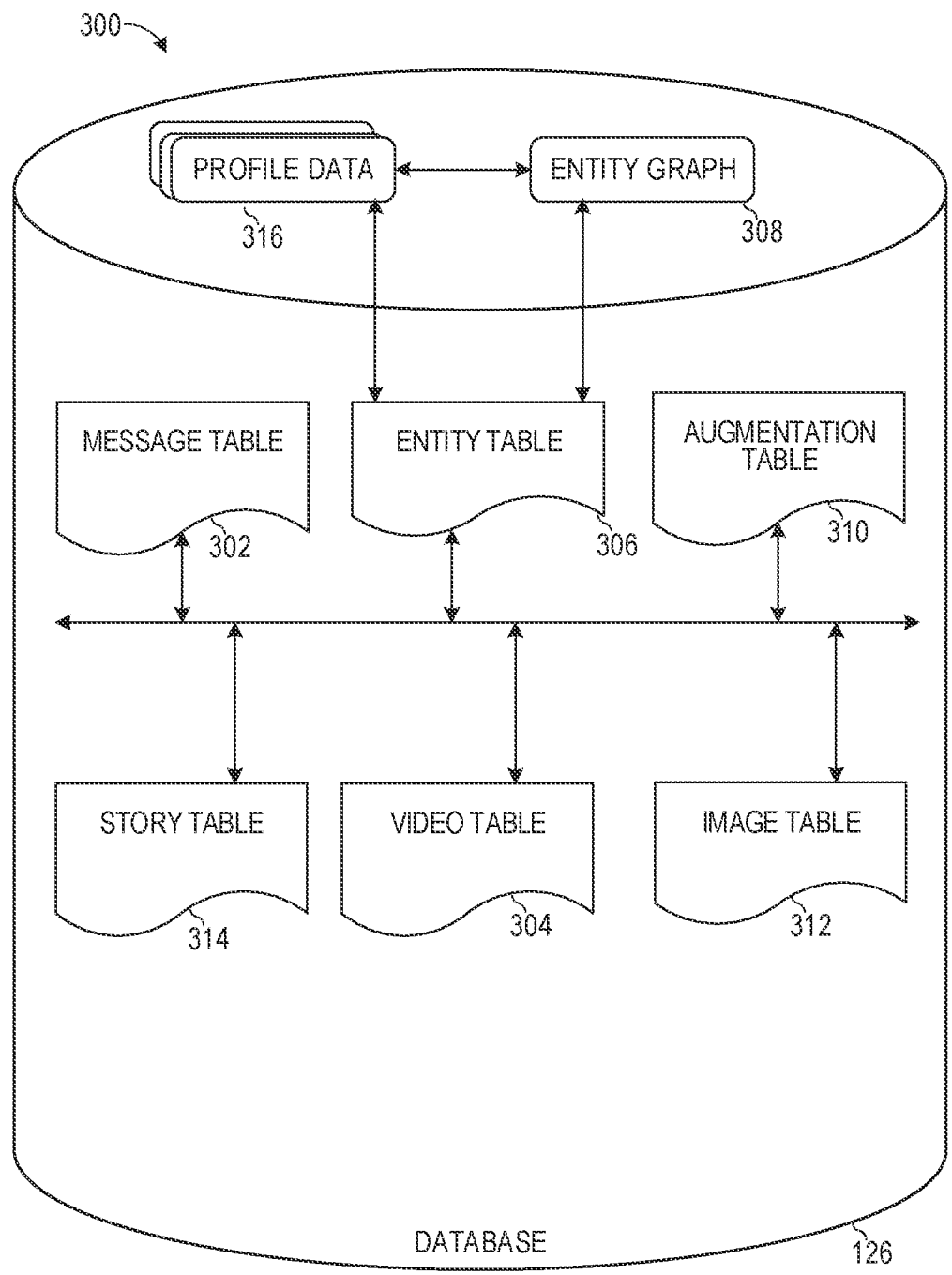
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5)-based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The 3D body model generation system 230 generates a bone-level skinned model of a human skeleton. Specifically, the 3D body model generation receives as input bone scales, joint angles, and shape coefficients and returns an array of 3D vertex locations. The 3D body model generation system 230 operates along two streams whose results are combined in a last stage. A first stream (shown on the top portion of FIG. 5) determines the internal skeleton by setting the bone scales through bone scaling coefficients $c_b$, delivering a bind (resting) pose. This is in turn converted to a new pose by specifying joint angles $\theta$, yielding the final skeleton $T(c_b, \theta)$. A second stream (shown on the bottom portion of FIG. 5) models the person-specific template synthesis process: Starting from a mesh corresponding to an average body type $\overline{V}$, the impact of bone scaling is absorbed by adding a shape correction term, Vb. This is in turn augmented by an identity-specific shape update Vs. The person template is represented by Equation 1 below:

$$V = \overline{V} + V_b + V_s \qquad \text{Equation 1}$$

The results of the two streams are bundled using linear blend skinning (LBS) to deliver a posed template $\hat{V}=LBS(V, T(c_b,\theta))$.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video. Each augmented reality experience may be associated with one or more marker images. In some embodiments, when a marker image is determined to match a query image received from the client device 102, the corresponding augmented reality experience (e.g., the augmentation data) of the maker image is retrieved from the image table 312 and provided to the client device 102. Various types of augmented reality experiences are shown and discussed in connection with FIG. 9.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the message table 302. The entity table 306 may associate various augmentations from the augmentation table 310 with various images and videos stored in the image table 312 and the video table 304.

Data Communications Architecture

Figure 4:
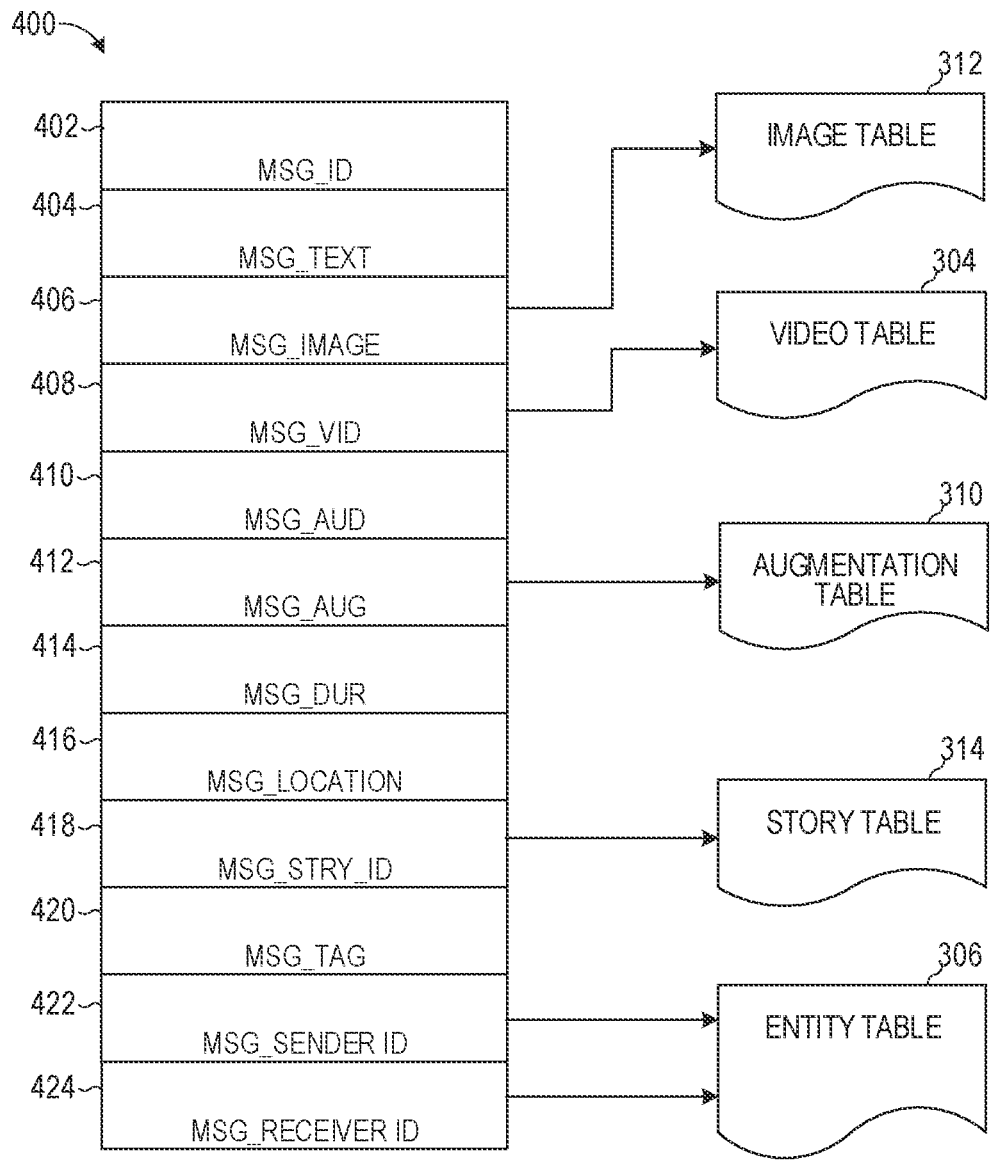
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
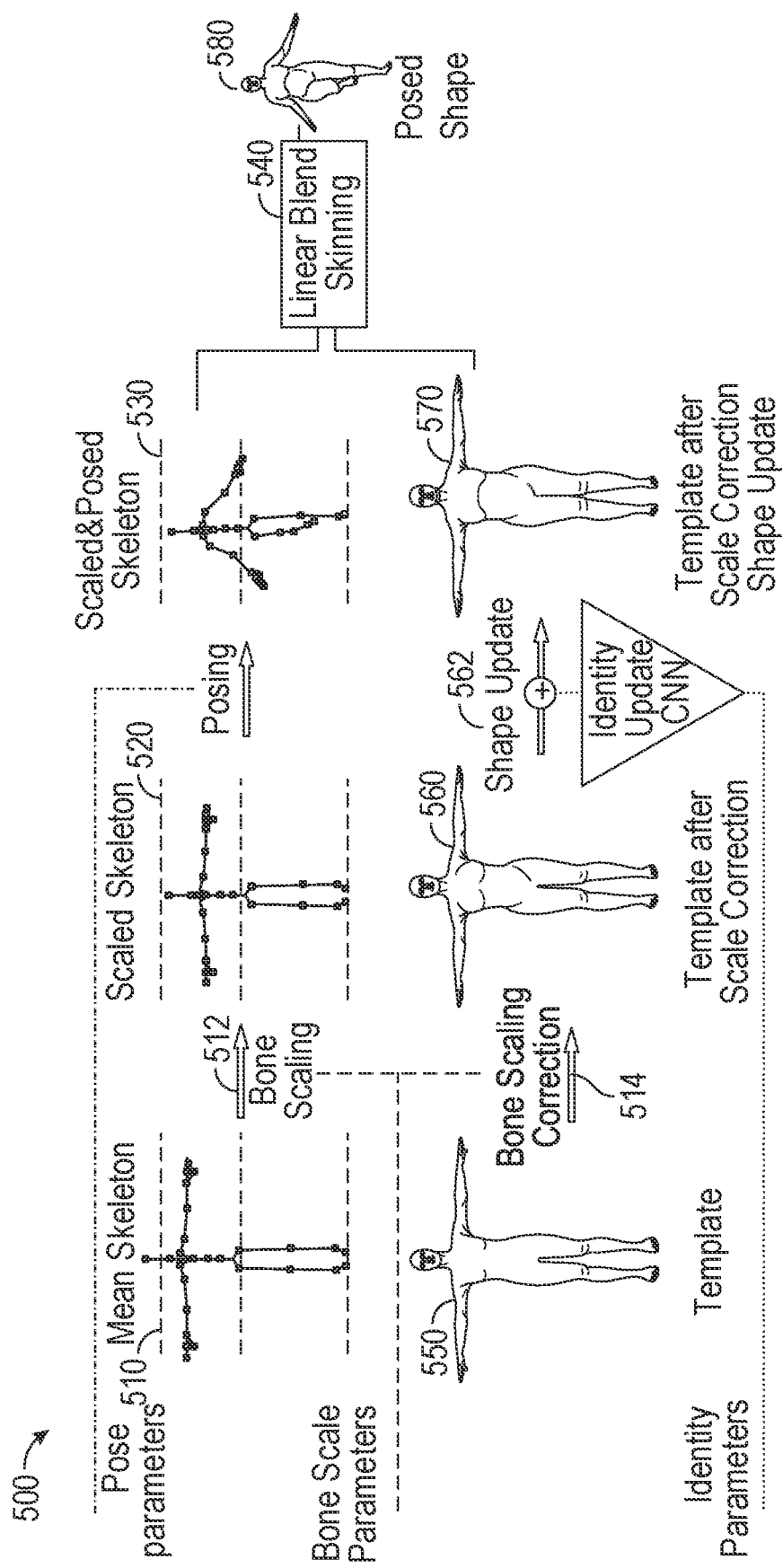
FIG. 5 is a diagrammatic representation of the operations performed by the 3D body model generation system, in accordance with some examples.

FIG. 5 is a diagrammatic representation 500 of the operations performed by the 3D body model generation system 230 according to some embodiments. Specifically, the top row shows skeleton synthesis: starting from a canonical bind pose 510, the bone lengths are first scaled and then an articulated transformation is applied. The bottom row shows shape control: the canonical mesh template is affected by the bone scaling transform through Bone-Scaling Blend Shapes, and then further updated to capture identity-specific shape variation. The skeleton drives the deformation of the resulting template through LBS, yielding the posed shape 580.

As an example, the model begins with a mean skeleton 510 in a resting or bind pose. This mean skeleton 510 represents the average population or whole population size. A template 550 or mesh that represents the look and feel (identity or skin) of the whole population or average population is also provided. As a first control, bone scale parameters 512 (referred to as b) are computed for a given person (e.g., a person depicted in a 2D image). These bone scale parameters 512 are used to adjust each individual bone length (e.g., increasing the size of the arms and decreasing the size of the legs) to output the scaled skeleton 520. In parallel or after scaling the skeleton, the template of the whole population is corrected based on the bone scale parameters by applying bone scale correction 514 (referred to as $V_b$). This outputs a template 560 having a size and scale that corresponds to the scaled skeleton 520.

A parameter $\theta$ is applied to the scaled skeleton to kinematically adjust the bones and joints of the scaled skeleton to be in a certain pose. This outputs the scaled and posed skeleton 530. A shape update parameter 562 (referred to as $V_S$) is applied to the template that has been scaled to account for person-specific variability, and a template 570 is generated after scale correction and the shape update. Linear blend skinning (LBS) 540 is applied to the scaled and posed skeleton 530 and to the template after scale correction and the template 570 to output the posed shape template 580. Namely, the template that represents the person's identity is posed based on the shape and pose of the skeleton 530 to output the posed shape. This posed shape can then be used to adjust a character animation or avatar that represents the person.

The skeleton 510 is determined by a tree-structured graph that ties together human bones through joint connections. Starting with a single bone, its 'bind pose' is expressed by a template rotation matrix Rt and translation vector Ot that indicate the displacement and rotation between the coordinate systems at the two bone joints. The transformation is modeled with respect to the bind pose through a rotation matrix R and a scaling factor s, bundled together in a 4×4 matrix T:

$$T = \underbrace{\begin{bmatrix} sI & 0 \\ 0 & 1 \end{bmatrix} \begin{bmatrix} R & 0 \\ 0 & 1 \end{bmatrix}}_{\text{deformation}} \underbrace{\begin{bmatrix} R^t & O^t \\ 0 & 1 \end{bmatrix}}_{\text{resting bone}} \quad \text{Equation 2}$$

Common models for character modelling use s=1 and only allow for limb rotation. Any change in object scale or bone length is modelled by modifying the displacement at the bind pose, O. This is done only implicitly, by regressing the bind pose joints from a 3D synthesized shape. The disclosed embodiments provide a handle on the scale of a limb through the parameter s, making the synthesis of the human skeleton explicitly controllable.

The full skeleton is constructed recursively, propagating from the root node to the leaf nodes along a kinematic chain. Every bone transformation encodes a displacement, rotation, and scaling between two adjacent bones, i and j, where i is the parent and j is the child node. To simplify notation, the modelling is described along a single kinematic chain, meaning j=i+1, and denotes the local transformation of a bone by $T^i$. The global transformation $T_j$ from the local coordinates of bone j to world coordinates is given by: $T_j = \Pi_{i \leq j} T^i$ where the transformations are composed for every bone on the path from the root to the j-th node. This product accumulates the effects of consecutive transformations: for instance a change in the scale of a bone will incur the same scaling for all of its descendants. These descendants can in turn have their own scale parameters, which are combined with those of their ancestors. The 3D position of each bone j can be read from the last column of Tj, while the upper-left 3×3 part of Tj provides the scaling and orientation of its coordinate system.

Human proportions are modeled explicitly by scaling each bone. In an example, principal component analysis (PCA) is performed on bone lengths and is used to express individual bone scales as: $b = \bar{b} + c_b P_b$ (Equation 3) where $c_b$ are the bone scaling coefficients, $P_b$ is the bone-scaling matrix and $\bar{b}$ is the mean bone scale. Referring back to FIG. 5, the bone scale parameters 512 scale the mean skeleton 510 in accordance with Equation 2 above by adjusting the $c_b$ for a specific person (e.g., a person depicted in a 2D image). The parameter $P_b$ is a learned parameter that is set for the population and is discussed in more detail in connection with FIG. 6. The bone scales s that appear in Equation 1 are meant to be used through the kinematic chain recursion, meaning that the product of parent scales delivers the actual bone scale, $b_j = \Pi_{i \leq j} s_i$. This can be used to transform the predictions of Equation 3 into a form that can be used in Equation 1:

$$s_i = \begin{cases} b_i / b_{i-1}, & i > 0 \\ 1 & i = 0 \end{cases}$$

Figure 8:
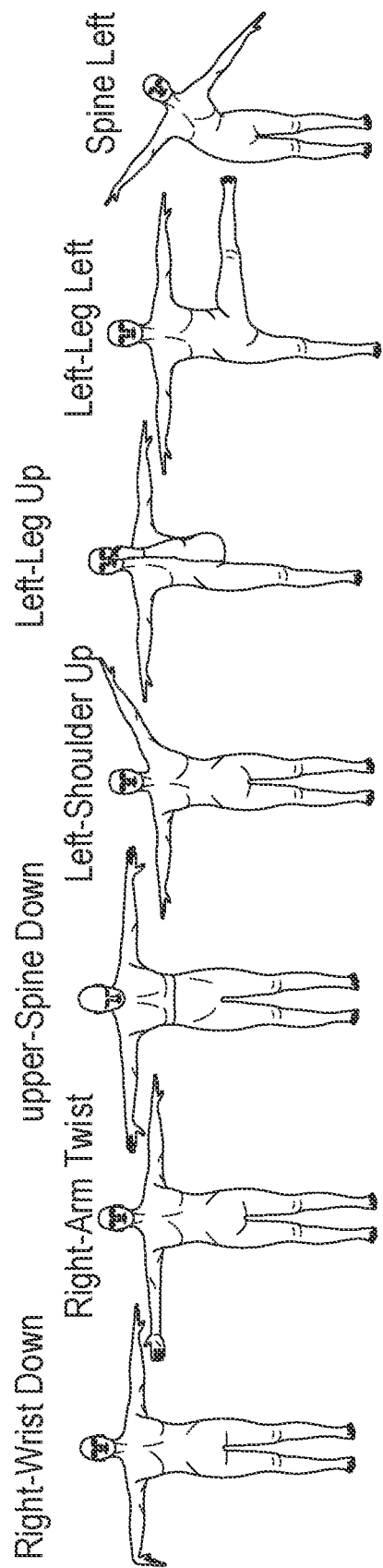
FIG. 8 shows sample meshes synthesized by posing a template along one valid degree of freedom, in accordance with some examples.

In order to adjust the pose of the skeleton to create the scaled and posed skeleton 530, the joint angles are modeled to account for the kinematic constraints of the human body. For instance, the knee has one degree of freedom, the wrist has two, and the neck has three. For each joint, the invalid degrees of freedom are set to be identically equal to zero, and the remaining angles are constrained to be in a plausible range (e.g., ±45 degrees for an elbow). FIG. 8 shows sample meshes synthesized by posing a template along one valid degree of freedom. For each such degree of freedom, an unconstrained variable $x \in R$ is used and mapped to a valid Euler angle $\theta \in [\theta min, \theta max]$ by using a hyperbolic tangent unit:

$$\theta = \frac{\theta_{max} - \theta_{min}}{2} \tanh(x) + \frac{\theta_{min} - \theta_{max}}{2}$$

This enables unconstrained optimization when fitting the model to data, while delivering kinematically feasible poses.

The resulting per-joint Euler angles are converted into a rotation matrix, delivering the matrix R in Equation 1.

The template 550 is modeled accounting for the bone length and the identity-specific variability of a person. Bone length can be used to account for a substantial part of body shape variability. For example, longer bones correlate with a male body-shape, while limb proportions can correlate with ectomorph, endomorph and mesomorph body-type variability. The bone-length dependent deformation of the template surface is represented through a linear update: $V_b = c_b P_{bc}$ where $P_{bc}$ is the matrix of bone-corrective blendshapes and is a learned parameter, as discussed in connection with FIG. 6

Figure 7:
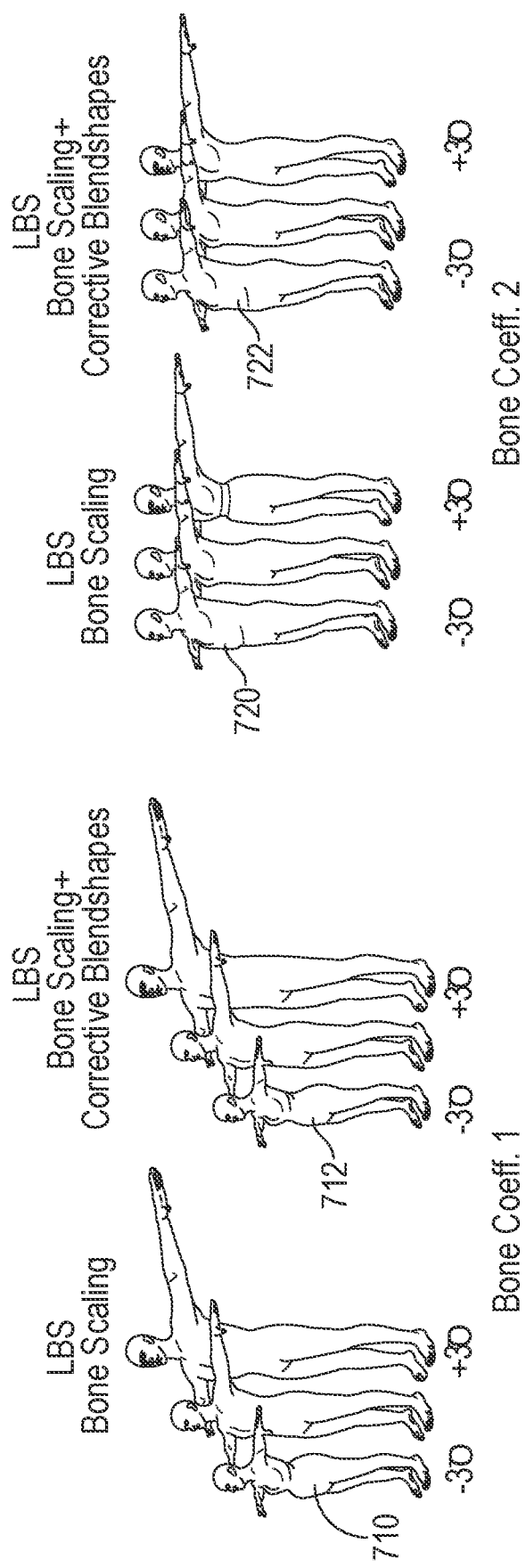
FIG. 7 shows the impact of bone length variation on the template, in accordance with some examples.

FIG. 7 shows the impact of bone length variation on the template. Plain linear blend skinning results in artifacts 710 and 720. The linear, bone-corrective blendshapes eliminate these artifacts and capture correlations of bone lengths with gender and body type. For example, artifacts 710 and 720 are no longer present in the templates 712 and 722. Specifically, if a given template is reduced in size based on smaller bones, typical template generation models introduce artifacts 710 and 720 whereas the templates 712 and 722 generated according to the disclosed embodiments do not have artifacts.

After accounting for the bone-length-dependent part of the shape variability is considered to generate an intermediate template 560, the person-specific variability is considered to generate the template 570 in accordance with $V_s$. In one embodiment, $V_s$ is computed linearly according to $V_s = c_s P_s$ where $c_s$ is the shape coefficients and $P_s$ is the matrix of shape components.

The template 570 is synthesized according to the skeleton using LBS where the deformation of the template mesh V is determined by the transformation of the skeleton. The bind pose of the skeleton is considered as described by the matrices $\hat{T}_j$ where the 3D mesh vertices take their canonical values $v_i \in V$ while the target pose is described by $T_j$. According to LBS, each vertex is influenced by every bone j according to a weight $w_{ij}$; the positions of the vertices at the target pose are given by:

$$\hat{v}_k = \sum_j w_{ij} T_j \hat{T}_j^{-1} v_k$$

This equation can be understood as charting every point $v_k$ with respect to the bind bone (by multiplying it with $\hat{T}_j^{-1}$) and then transporting to the target bone (by multiplying with $T_j$).

Figure 6:
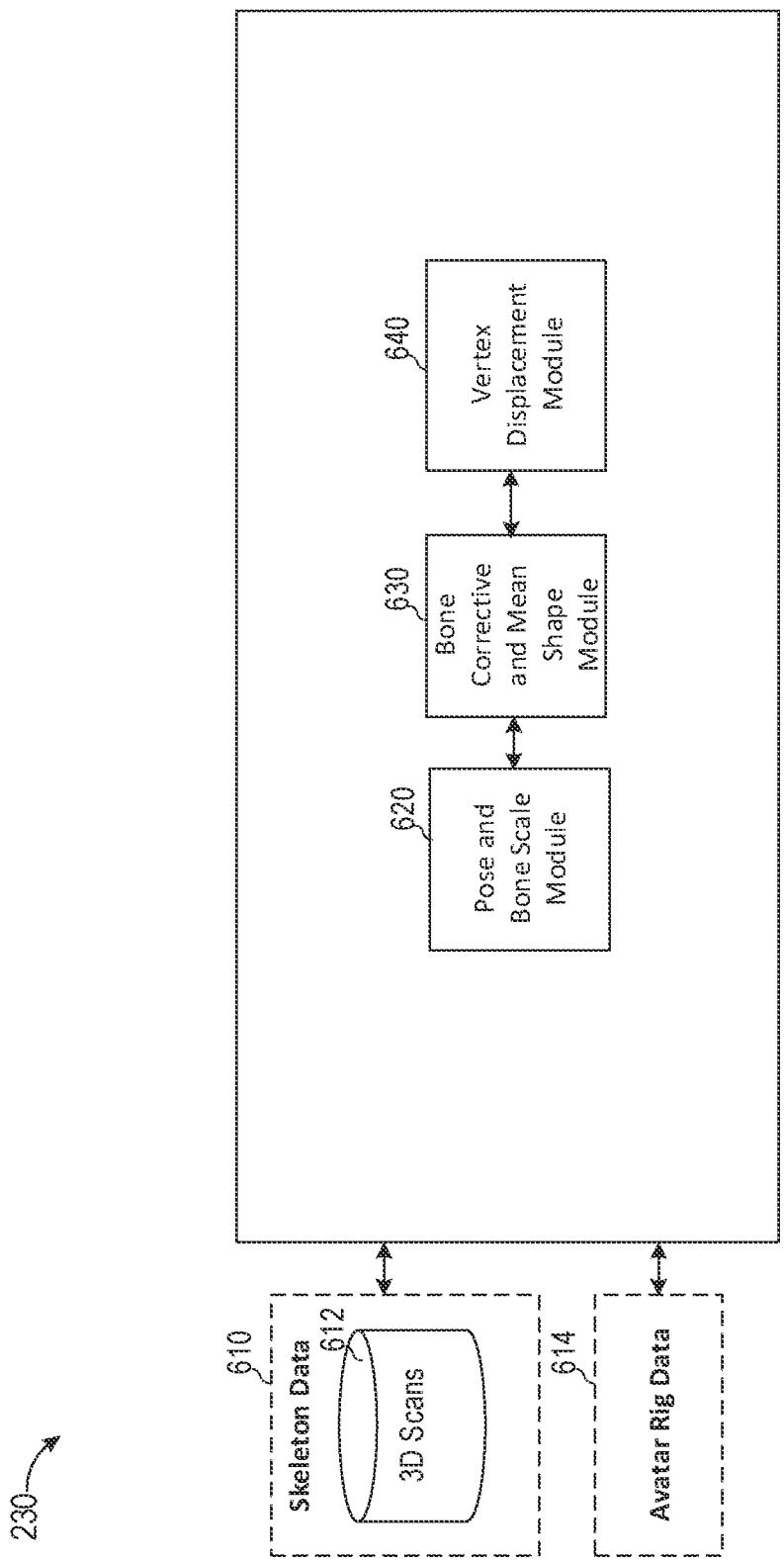
FIG. 6 illustrates the 3D body model generation system and more specifically the training of the 3D body model generation system, in accordance with some examples.

FIG. 6 illustrates the 3D body model generation system 230 and more specifically the training of the 3D body model generation system 230 according to some embodiments. The 3D body model generation system 230 includes a pose and bone scale module 620, a bone corrective and mean shape module 630, and a vertex displacement module 640. The 3D body model generation system 230 receives skeleton data 610 (e.g., provided by landmark positions generated from a 2D image that depicts a person and processed by a neural network). In some cases, the 3D body model generation system 230 operates on avatar rig data 614 to adapt an avatar or character to correspond to physical attributes and shape and size of a person depicted in a 2D image.

To train the 3D body model generation system 230, a collection of 3D scans that depict various persons in different poses and shapes are processed. Training is performed in multiple stages. Training results in learning the above parameters of the model from data. In some cases, the 3D scans include high-resolution 3D scans 612 of 4400 subjects wearing tight clothing. The training process solves successively demanding optimization problems and uses automatic differentiation to efficiently compute derivatives during optimization.

Each 3D scan 612 $S^n$ is associated with 73 anatomical landmarks $L^n$ that have been localized in 3D. The training starts by fitting the template to these landmarks by gradient descent on the joint angles and bone scales $s^n$, so as to minimize the 3D distances between the landmark positions and the respective template vertices. More specifically, the pose and bone scale module 620 solves the following optimization problem:

$$\theta^n, s^n = \mathrm{argmin}_{\theta,s} \|A \mathrm{LBS}(V_T, T(s,\theta)) - L^n\|^2 \qquad \text{Equation 4}$$

where A selects the subset of landmarks from the template. The result of solving the above optimization problem of Equation 4 is a collection of 4400 $\theta^n$ and bone scales $s^n$ parameters when 4400 3D scans 612 are processed.

Specifically, the pose and bone scale module 620, for each 3D scan 612, applies LBS to the template according to a skeleton so as to find the joint angle $\theta$ and bone scale s parameters that minimize a distance to the landmarks of the given 3D scan 612. This delivers an initial fitting, which is further refined by registering the prediction $\hat{S}^n = \mathrm{LBS}(V_T, T(s^n, \theta^n))$ to each scan 612.

In some cases, the bone scaling basis is used as a regularizer to re-estimate the pose $\theta^n$ and the bone scale coefficients $c_b^n$ to match the template $V_T$ to each registration $\hat{S}^n$ by solving the optimization problem of Equation 5:

$$\theta^n, c_b^n = \mathrm{argmin}_{\theta, c_b} \|\mathrm{LBS}(V_T, T(c_b, \theta)) - \hat{S}^n\|^2 \qquad \text{Equation 5}$$

The outputs of Equation 5 are provided to the bone corrective and mean shape module 630 to compute and determine the bone-corrective parameter $P_{bc}$ and means shape parameter $\overline{V}$. To determine these parameters, the following optimization problem defined by Equation 6 is solved:

$$P_{bc}^*, \overline{V}^* = \mathrm{argmin}_{P_b, \overline{v}} \sum_{n=1}^{N} \left\| \mathrm{LBS}(\overline{V} + c_b^n P_{bc}, T(c_b^n, \theta^n)) - \hat{S}^n \right\|^2 \qquad \text{Equation 6}$$

As an example, the bone corrective and mean shape module 630 processes each 3D scan 612 and minimizes the LBS function difference between the ground truth template and the template as computed using the corresponding pose $\theta^n$ and the bone scale coefficients $c_b^n$ computed for the particular 3D scan 612 by Equations 4 or 5.

Once bone-corrected blendshapes have been used to improve the fit of the model to the registered shape $S^n$, the residual in the reconstruction is attributed only to identity-specific shape variability. The vertex displacement module 640 adjusts the parameters to account for the identity-specific shape variability by deriving the function $V_D$. Specifically, the residuals are modeled as vertex displacements $V_{D^n}$ and estimated for each registration $\hat{S}^n$ by setting $\mathrm{LBS}(\overline{V} + V_b^n + V_{D^n}, T(c_b^n, \theta^n)) = \hat{S}^n$ to ensure that the residual is defined by the T-pose coordinate system.

Given a new 3D scan, the pose and bone scale module 620 adapts the parameters $\theta^n$ and the bone scale coefficients $c_b^n$ and the bone corrective and mean shape module 630 uses these adapted parameters to adjust the template. The template is then improved to represent the person depicted in the 3D scan by applying the landmarks of the 3D scan to the decoder.

In some cases, the blending weights of our LBS formulation are manually initialized. To improve this process, registrations of a variety of identity and poses is processed. For each registration in the dataset, the parameters are first estimated, namely, $c_b^n$, $c_s^n$, $\theta^n$ as well as the residual DD which is the error on the T-pose coordinate system after taking into account the shape blendshapes. Then, the blending weights are optimized to minimize the following error:

$$\arg\min_w \sum_{n=1}^{N} \left\| S_n - LBS_w(\overline{V} + V_b^n + V_s^n + \hat{V}_D^n, T(c_b^n, \theta^n)) \right\|^2$$

The mapping $$W = \frac{f(W')}{\Sigma_j f(W')_{ij}}$$

with $f(X)=\sqrt{X^2+\varepsilon}$ is used to optimize freely W' while ensuring the output weights W satisfy the LBS blending weights constraints:

$\Sigma_j W_{ij}=1$, and math$bfW_{ij}\geq 0$.

In some cases, first the vertices on the torso are fitted (e.g., those vertices defined by the blending weights of the torso bones on the template) by optimizing over the shape coefficients and the joint angles of the torso bones. Then for a second and third stage, upper limbs and lower limbs are added respectively. In the last stage, all the vertices are used to fine-tune the fitted parameters.

Figure 9:
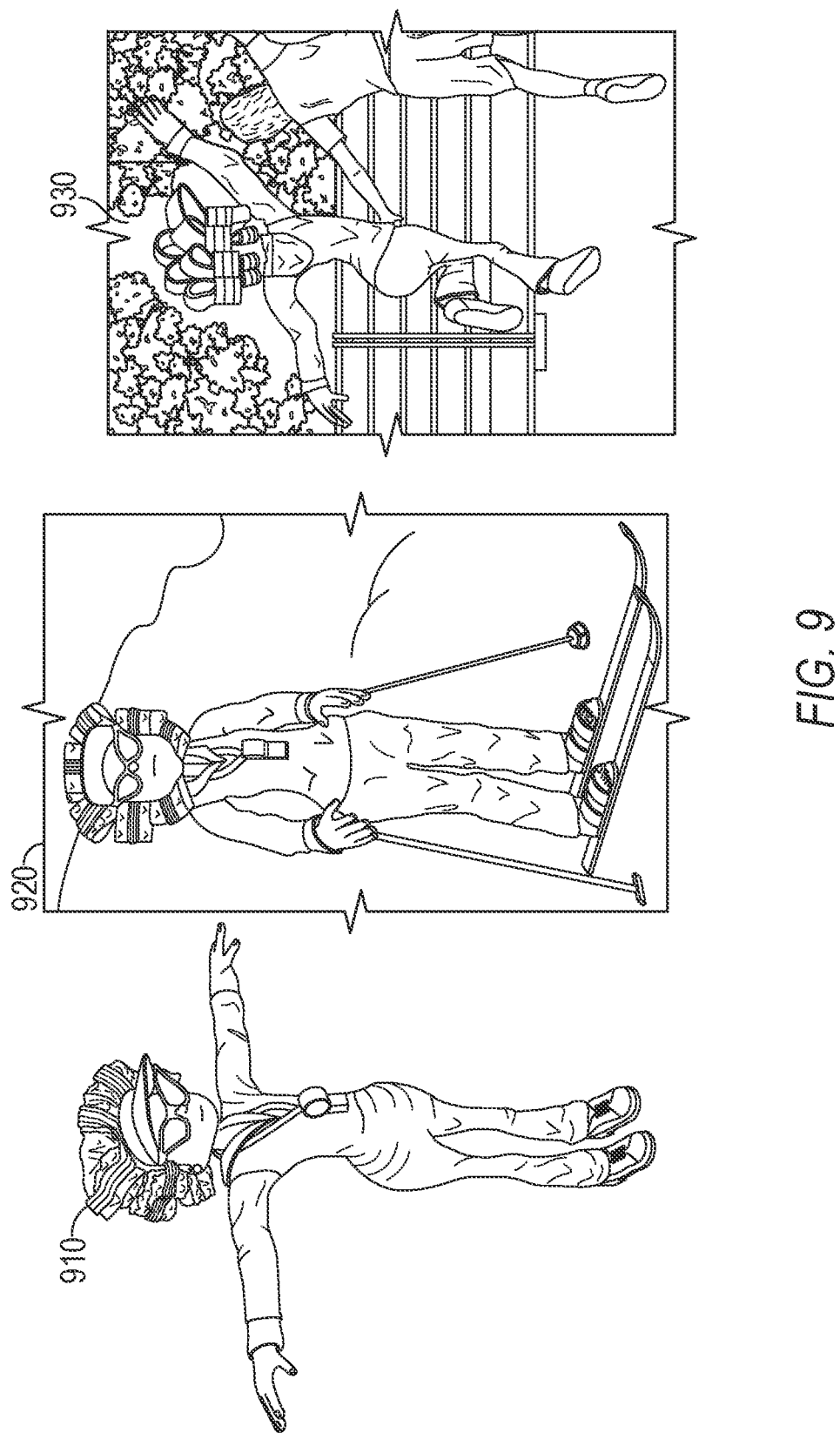
FIG. 9 is a diagrammatic representation of graphical user interfaces, in accordance with some examples.

FIG. 9 shows an example of matching an avatar or character to a person in an image, according to some embodiments. In some embodiments, a rigged character 910 is received. This rigged character 910 is received by selecting the character from multiple rigged characters. The rigged character 910 is applied to the skeleton provided by the 3D body model generation system 230. Given an image of a person (e.g., as shown in 930), the model is fit to the person to estimate the bone transformations (scales and rotations) of the person in the image. The bone transformations are applied to the rigged character to allow accurate image-driven character animation. In an example, the rigged character, as adapted by the bone transformations of the person, is displayed together with the person, as shown in 930. Alternatively, the rigged character is presented in replacement of the person as shown in 920. In some cases, the arms of the character as rigged are extended if the model determines that the bone transformations of the depicted person in the 2D image are larger than the average or mean skeleton. In some cases, the arms of the character as rigged are shortened if the model determines that the bone transformations of the depicted person in the 2D image are smaller than the average or mean skeleton. Identity attributes of the character are also adapted based on the shape attributes determined by the model. This allows the system to transform any person into the selected avatars or characters, while preserving the pose and body type of the person in the image.

Figure 10:
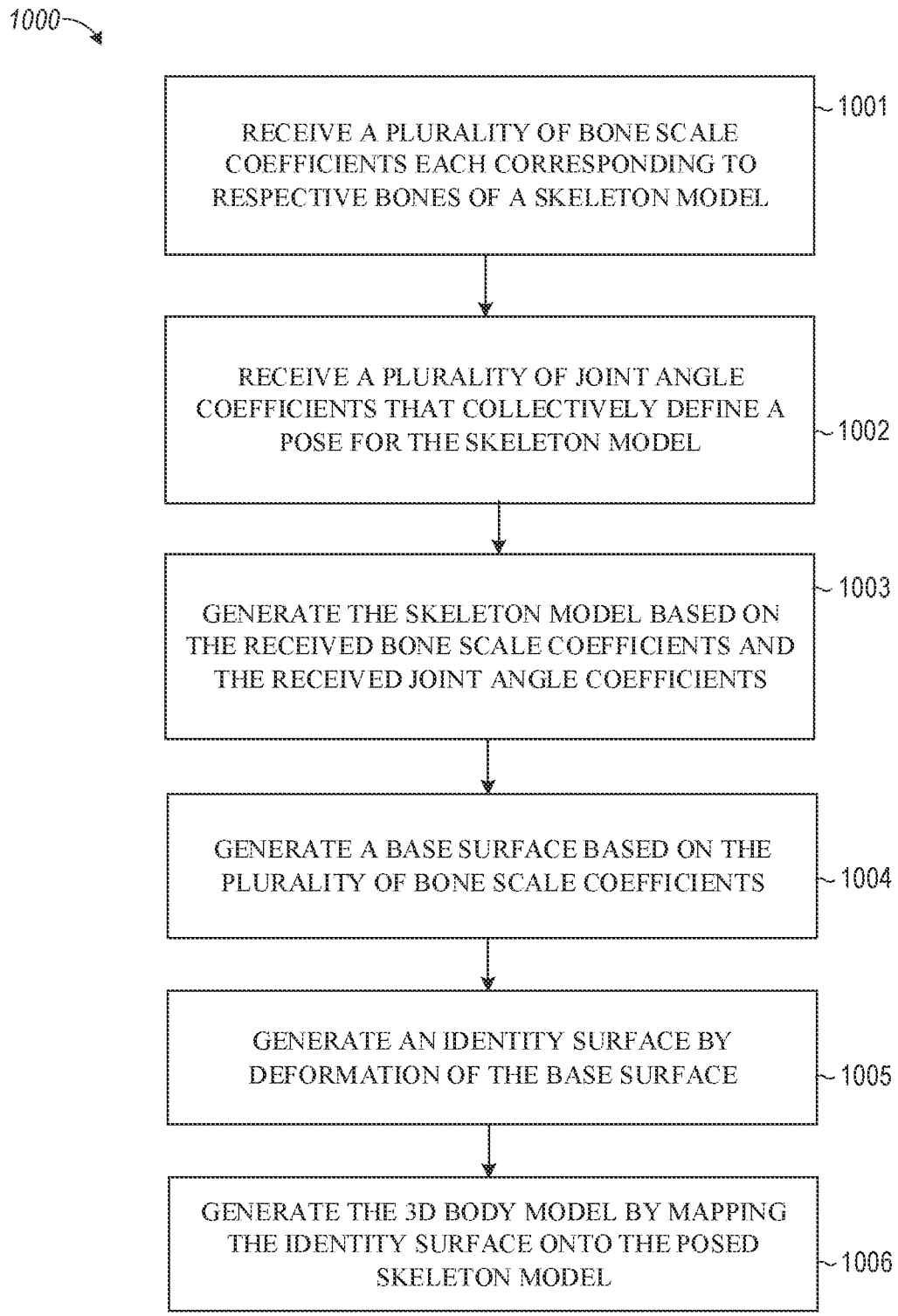
FIG. 10 is a flowchart illustrating example operations of the messaging application server, according to example embodiments.

FIG. 10 is a flowchart illustrating example operations of the messaging client 104 in performing process 1000, according to example embodiments. The process 1000 may be embodied in computer-readable instructions for execution by one or more processors such that the operations of the process 1000 may be performed in part or in whole by the functional components of the messaging server system 108; accordingly, the process 1000 is described below by way of example with reference thereto. However, in other embodiments at least some of the operations of the process 1000 may be deployed on various other hardware configurations. The operations in the process 1000 can be performed in any order, in parallel, or may be entirely skipped and omitted.

At operation 1001, the image processing server 122 receives a plurality of bone scale coefficients each corresponding to respective bones of a skeleton model. For example, the image processing server 122 receives the bone scale parameters 512. In some cases, these are received as bone scale coefficients $c_b$.

At operation 1002, the image processing server 122 receives a plurality of joint angle coefficients that collectively define a pose for the skeleton model. For example, the image processing server 122 receives the posing parameters $\theta^n$.

At operation 1003, the image processing server 122 generates the skeleton model based on the received bone scale coefficients and the received joint angle coefficients. For example, the image processing server 122 generates the scaled and posed skeleton 530.

At operation 1004, the image processing server 122 generates a base surface based on the plurality of bone scale coefficients. For example, the image processing server 122 generates a template 560.

At operation 1005, the image processing server 122 generates an identity surface by deformation of the base surface. For example, the image processing server 122 adapts the template 560 based on the bone parameters and applies identity information using a shape update parameter 562 to generate the template 570.

At operation 1006, the image processing server 122 generates the 3D body model by mapping the identity surface onto the posed skeleton model. For example, the image processing server 122 uses LBS 540 to adapt the template 570 based on the scaled and posed skeleton 530 to output the posed template 580.

Machine Architecture

Figure 11:
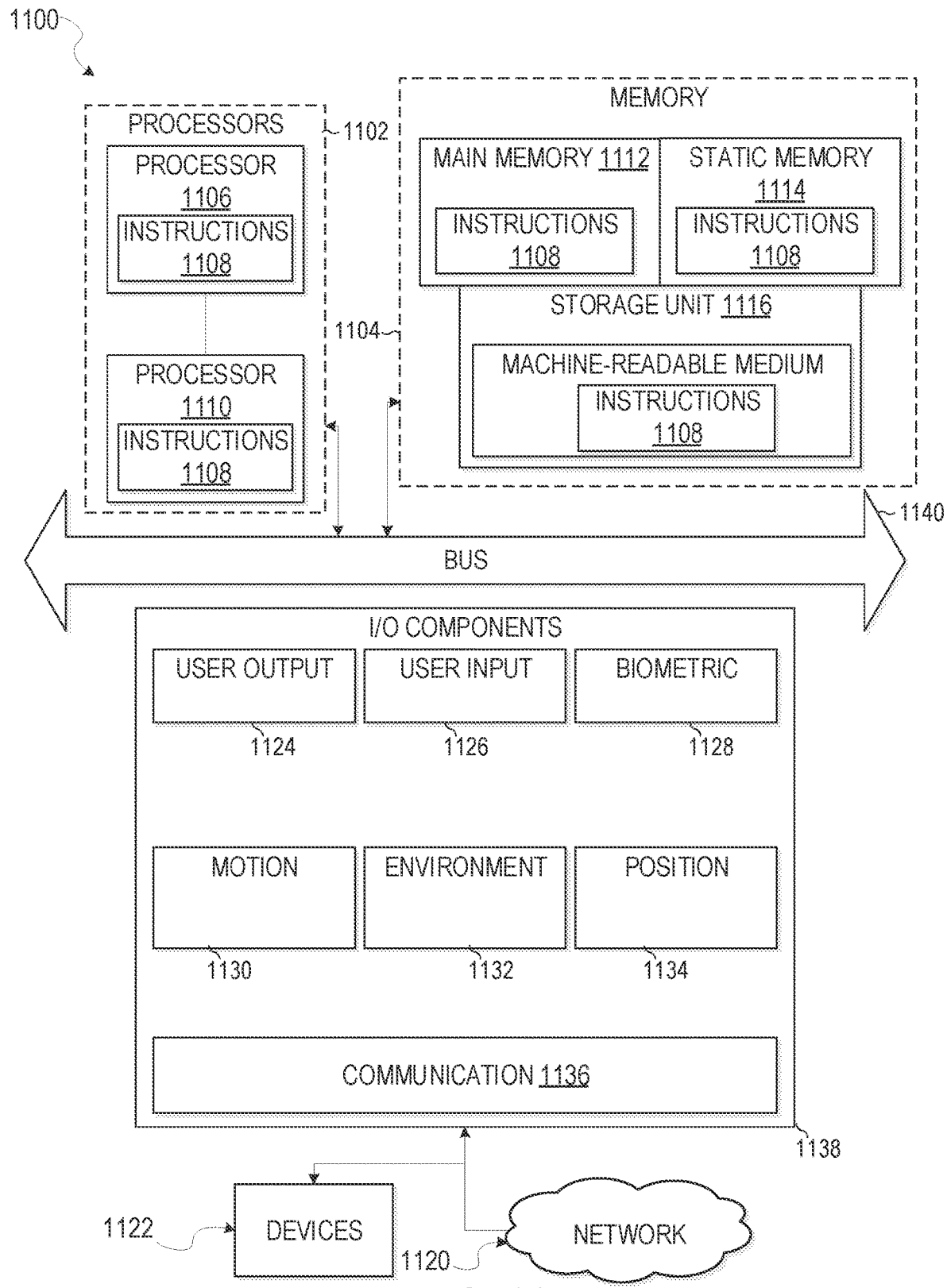
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within a machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
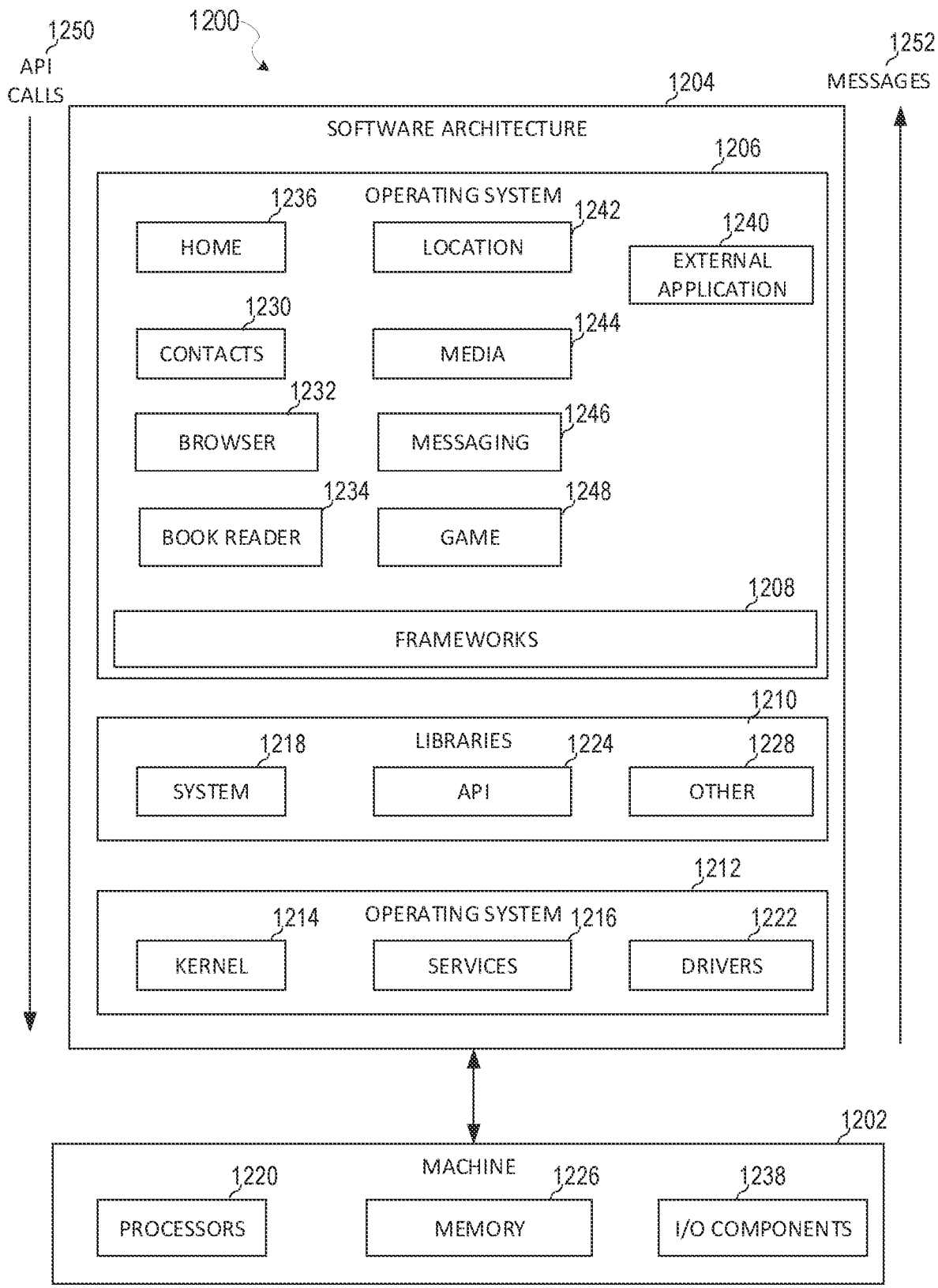
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications, such as an external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method of generating a 3D body model, the method comprising:
   receiving a plurality of bone scale coefficients each corresponding to respective bones of a skeleton model;
   receiving a plurality of joint angle coefficients that collectively define a pose for the skeleton model;
   obtaining a mean skeleton and a body template that represents an average population;
   adjusting each individual bone length of the mean skeleton based on the plurality of bone scale coefficients to generate a scaled skeleton model in parallel with correcting the body template based on the plurality of bone scale coefficients, wherein some components of the mean skeleton are reduced in size to match the respective bones of the skeleton model while other components of the mean skeleton remain unchanged in size;
   after adjusting each individual bone length of the mean skeleton model to generate the scaled skeleton model, generating a posed skeleton model based on the scaled skeleton model and the received joint angle coefficients;
   generating an identity surface by deformation of a base surface comprising the corrected body template;
   generating the 3D body model by mapping the identity surface onto the posed skeleton model; and
   training a 3D model generator to generate the 3D body model by performing training operations comprising:
     obtaining a collection of 3D scans that depict various persons in different poses and shapes, each 3D scan of the collection of 3D scans being associated with a set of anatomical landmarks that have been localized in 3D;
     fitting an individual template to the set of landmarks by gradient descent on joint angles and bone scales to minimize 3D distances between landmark positions and respective template vertices to generate a collection of bone scales and parameters;
     refining the fitting of the individual template by registering a prediction of each of the parameters to each 3D scan; and minimizing a function based on a difference between a ground truth template and the refined fitted individual template.

2. The method of claim 1, wherein the skeleton model comprises a tree-structured graph, and generating the skeleton model comprises a recursive generation of a root bone element and a plurality of leaf bone elements.

3. The method of claim 2, wherein the skeleton model comprises a resting position for each bone element, and a rotation matrix and a scaling factor for each bone element, wherein the rotation matrix and the scaling factor are applied recursively to each bone element in sequence.

4. The method of claim 3, wherein the resting position for each bone element is represented by a template rotation matrix and a translation vector for the respective bone element.

5. The method of claim 1, wherein the plurality of joint angle coefficients are each restrained to a kinematically valid angular range.

6. The method of claim 5, wherein each of the plurality of joint angle coefficients is restrained by mapping a corresponding unconstrained variable to the kinematically valid angular range.

7. The method of claim 1, wherein the joint angle coefficients comprise 47 joint angle coefficients.

8. The method of claim 1, wherein generating the base surface comprises generating a mean surface and applying a correction to the mean surface based on a bone-length dependent deformation.

9. The method of claim 1, wherein generating the identity surface comprises deformation of the base surface based on a plurality of linear identity parameters.

10. The method of claim 1, wherein mapping the identity surface onto the posed skeleton model comprises mapping using a linear blend skinning process, wherein the 3D body model corresponds to a human or an animal.

11. The method of claim 10, wherein the linear blend skinning process comprises mapping a surface point on the identity surface based on a bone element of the skeleton model, by charting the surface point with respect to a resting position for the bone element, and transporting the charted point based on a posed position for the respective bone element.

12. The method of claim 11, wherein the linear blend skinning process comprises mapping the surface point on the identity surface based on each bone element of the skeleton model, and calculating a weighting factor for each respective mapping.

13. The method of claim 1, wherein the plurality of bone scale coefficients and the plurality of joint angle coefficients are determined based on image processing of an input 2D image, the input 2D image comprising a representation of at least one body.

14. The method of claim 13, further comprising processing, using a deep convolutional neural network, the 2D image to detect presence of at least one body, and to estimate the plurality of bone scale coefficients and the plurality of joint angle coefficients for the at least one detected body.

15. The method of claim 14, further comprising generating an output 2D image based on the input 2D image and the generated 3D body model, wherein the representation of a body in the input image is replaced with a corresponding 2D representation of the 3D body model.

16. The method of claim 15, wherein generating the output 2D image comprises:

generating the 3D body model based on the plurality of bone scale coefficients and the plurality of joint angle coefficients determined from the input 2D image;

generating a 2D projection of the 3D body model, based on the input 2D image; and overlaying the 2D projection onto the representation of a body in the input image.

17. A system for generating a 3D body model comprising:
at least one processor configured to perform operations comprising:
receiving a plurality of bone scale coefficients each corresponding to respective bones of a skeleton model;
receiving a plurality of joint angle coefficients that collectively define a pose for the skeleton model;
obtaining a mean skeleton and a body template that represents an average population;
adjusting each individual bone length of the mean skeleton based on the plurality of bone scale coefficients to generate a scaled skeleton model in parallel with correcting the body template based on the plurality of bone scale coefficients, wherein some components of the mean skeleton are reduced in size to match the respective bones of the skeleton model while other components of the mean skeleton remain unchanged in size;
after adjusting each individual bone length of the mean skeleton model to generate the scaled skeleton model generating a posed skeleton model based on the scaled skeleton model and the received joint angle coefficients;
generating an identity surface by deformation of a base surface comprising the corrected body template;
generating the 3D body model by mapping the identity surface onto the posed skeleton model; and
training a 3D model generator to generate the 3D body model by performing training operations comprising:
obtaining a collection of 3D scans that depict various persons in different poses and shapes, each 3D scan of the collection of 3D scans being associated with a set of anatomical landmarks that have been localized in 3D;
fitting an individual template to the set of landmarks by gradient descent on joint angles and bone scales to minimize 3D distances between landmark positions and respective template vertices to generate a collection of bone scales and parameters;
refining the fitting of the individual template by registering a prediction of each of the parameters to each 3D scan; and
minimizing a function based on a difference between a ground truth template and the refined fitted individual template.

18. The system of claim 17, wherein the skeleton model comprises a tree-structured graph, and generating the skeleton model comprises a recursive generation of a root bone element and a plurality of leaf bone elements.

19. The system of claim 18, wherein the skeleton model comprises a resting position for each bone element, and a rotation matrix and a scaling factor for each bone element, wherein the rotation matrix and the scaling factor are applied recursively to each bone element in sequence.

20. A non-transitory machine-readable storage medium that includes instructions that, when executed by one or more processors of a machine, cause the machine to perform operations for generating a 3D body model comprising:
receiving a plurality of bone scale coefficients each corresponding to respective bones of a skeleton model;

receiving a plurality of joint angle coefficients that collectively define a pose for the skeleton model;

obtaining a mean skeleton and a body template that represents an average population;

adjusting each individual bone length of the mean skeleton based on the plurality of bone scale coefficients to generate a scaled skeleton model in parallel with correcting the body template based on the plurality of bone scale coefficients, wherein some components of the mean skeleton are reduced in size to match the respective bones of the skeleton model while other components of the mean skeleton remain unchanged in size;

after adjusting each individual bone length of the mean skeleton model to generate the scaled skeleton model generating a posed skeleton model based on the scaled skeleton model and the received joint angle coefficients;

generating an identity surface by deformation of a base surface comprising the corrected body template;

generating the 3D body model by mapping the identity surface onto the posed skeleton model; and training a 3D model generator to generate the 3D body model by performing training operations comprising:

obtaining a collection of 3D scans that depict various persons in different poses and shapes, each 3D scan of the collection of 3D scans being associated with a set of anatomical landmarks that have been localized in 3D;

fitting an individual template to the set of landmarks by gradient descent on joint angles and bone scales to minimize 3D distances between landmark positions and respective template vertices to generate a collection of bone scales and parameters;

refining the fitting of the individual template by registering a prediction of each of the parameters to each 3D scan; and minimizing a function based on a difference between a ground truth template and the refined fitted individual template.

* * * * *

UNITED STATES PATENT AND TRADEMARK OFFICE
CERTIFICATE OF CORRECTION

| | | |
|---|---|---|
| PATENT NO. | : 11,915,365 B2 | Page 1 of 1 |
| APPLICATION NO. | : 16/949781 | |
| DATED | : February 27, 2024 | |
| INVENTOR(S) | : Guler et al. | |

It is certified that error appears in the above-identified patent and that said Letters Patent is hereby corrected as shown below:

On the Title Page

On page 2, in Column 2, under Item (56) "Other Publications", Line 8, delete "Mutli-Person" and insert --Multi-Person-- therefor Signed and Sealed this
Twenty-ninth Day of April, 2025

Coke Morgan Stewart
*Acting Director of the United States Patent and Trademark Office*